US007479179B2

(12) United States Patent
Szajewski

(10) Patent No.: US 7,479,179 B2
(45) Date of Patent: Jan. 20, 2009

(54) PIGMENT INKS HAVING EXCELLENT IMAGE AND STORAGE PROPERTIES

(75) Inventor: Richard P. Szajewski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 493 days.

(21) Appl. No.: 11/198,764

(22) Filed: Aug. 5, 2005

(65) Prior Publication Data

US 2007/0028800 A1 Feb. 8, 2007

(51) Int. Cl.
*C09D 11/02* (2006.01)

(52) U.S. Cl. .................................. 106/31.6; 106/31.86

(58) Field of Classification Search ................ 106/31.6, 106/31.86

See application file for complete search history.

(56) References Cited

U.S. PATENT DOCUMENTS

| | | | |
|---|---|---|---|
| 5,554,739 | A | 9/1996 | Belmont |
| 5,707,432 | A | 1/1998 | Adams et al. |
| 5,803,959 | A | 9/1998 | Johnson et al. |
| 5,922,118 | A | 7/1999 | Johnson et al. |
| 5,977,207 | A | 11/1999 | Yui et al. |
| 6,187,086 | B1 | 2/2001 | Rehman |
| 6,280,513 | B1 | 8/2001 | Osumi et al. |
| 6,383,274 | B1 | 5/2002 | Lin |
| 6,436,180 | B1 | 8/2002 | Ma et al. |
| 6,475,271 | B2 | 11/2002 | Lin |
| 6,488,753 | B1 | 12/2002 | Ito et al. |
| 6,500,248 | B1 | 12/2002 | Hayashi |
| 6,503,311 | B1 | 1/2003 | Kari et al. |
| 6,506,239 | B1 | 1/2003 | Osumi et al. |
| 6,638,350 | B2 * | 10/2003 | Butler et al. ............ 106/31.28 |
| 6,660,075 | B2 | 12/2003 | Bergemann et al. |
| 6,719,420 | B2 * | 4/2004 | Tomioka et al. ............ 347/100 |
| 6,758,891 | B2 | 7/2004 | Bergemann et al. |
| 6,852,156 | B2 | 2/2005 | Yeh et al. |
| 2002/0029722 | A1 * | 3/2002 | Shioya et al. ........... 106/31.43 |
| 2003/0079651 | A1 | 5/2003 | Rehman |
| 2004/0123773 | A1 | 7/2004 | Butler et al. |
| 2004/0123774 | A1 | 7/2004 | Yamazaki et al. |
| 2005/0014864 | A1 | 1/2005 | Akers, Jr. et al. |
| 2007/0132822 | A1 * | 6/2007 | Szajewski et al. .......... 347/100 |

FOREIGN PATENT DOCUMENTS

| | | | |
|---|---|---|---|
| EP | 1 219 689 | A1 | 7/2002 |
| EP | 1 321 495 | A1 | 6/2003 |
| EP | 1 479 732 | A1 | 11/2004 |
| EP | 1 493 785 | A1 | 1/2005 |
| JP | 2004-143386 | | 5/2004 |
| JP | 2005/82663 | | 3/2005 |
| WO | WO 96/18688 | | 6/1996 |
| WO | WO 96/18689 | | 6/1996 |
| WO | WO 96/18695 | | 6/1996 |
| WO | WO 96/18696 | | 6/1996 |
| WO | WO 99/51690 | | 10/1999 |
| WO | WO 01/51566 | | 7/2001 |
| WO | WO 03/014238 | A1 | 2/2003 |

* cited by examiner

*Primary Examiner*—J. A. Lorengo
*Assistant Examiner*—Veronica Faison-Gee
(74) *Attorney, Agent, or Firm*—Sarah Meeks Roberts; Andrew J. Anderson

(57) ABSTRACT

This invention relates to an ink jet ink comprising water, a charged self-dispersed pigment characterized in having a charge equivalence of at least 0.5 mEq/g, a volatile counterion content of 0.01 to 0.5 percent by weight, and a surface-active paper penetrant.

25 Claims, No Drawings

PIGMENT INKS HAVING EXCELLENT IMAGE AND STORAGE PROPERTIES

FIELD OF THE INVENTION

This invention relates to ink jet inks and particular to self-dispersed pigment-based inks exhibiting both excellent storage properties and excellent image forming properties when used individually and as part of an ink jet ink set.

BACKGROUND OF THE INVENTION

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the image-recording element, while un-imaged droplets are caught and returned to an ink sump. Ink jet printers have found broad applications across markets ranging from desktop document and photographic-quality imaging, to short run printing and industrial labeling.

The inks used in the various inkjet printers can be classified as either dye-based or pigment-based. A dye is a colorant that is dissolved in the carrier medium. A pigment is a colorant that is insoluble in the carrier medium, but is dispersed or suspended in the form of small particles. These small particles can be stabilized against flocculation and settling by the use of distinct dispersing agents such as surfactants, oligimers or polymers, or they can be directly functionalized to provide a self-dispersing characteristic. In either case the carrier medium can be a liquid or a solid at room temperature. Commonly used carrier media include water, mixtures of water and organic co-solvents and high boiling organic solvents, such as hydrocarbons, esters, ketones, alcohols and ethers.

Pigment-based inkjet inks are often preferred over dye-based inkjet inks because of the superior image stability typically observed with the pigment-based inks. Self-dispersed pigments in turn are often preferred over surfactant-dispersed, oligimer-dispersed or polymer-dispersed pigments because of their greater stability to a variety of ink formulations and environmental keeping conditions.

Several workers have reported the preparation of covalently functionalized self-dispersed pigments suitable for ink jet printing. Bergemann, et al., in U.S. Pat. No. 6,758, 891 B2 describe the covalent functionalization of pigments by reaction with organic triazoles. Bergemann, et al., in U.S. Pat. No. 6,660,075 B2 further describe the covalent functionalization of pigments by reaction with unsaturated organic compounds. Belmont in U.S. Pat. No. 5,554,739, Adams and Belmont in U.S. Pat. No. 5,707,432, Johnson and Belmont in U.S. Pat. Nos. 5,803,959 and 5,922,118 and in published applications WO 96/18695, WO 96/18696, WO 96/18689, WO 99/51690, WO 00/05313, and WO 01/51566 describe the covalent functionalization of pigments with diazonium compounds. Like preparations of covalently functionalized self-dispersed pigments are additionally described by Osumi et al., in U.S. Pat. Nos. 6,280,513 B1 and 6,506,239 B1. These publications further describe the preparation and use of inkjet inks employing the described self-dispersed pigments. Both anionic and cationic self-dispersed pigments are described. Karl, et al., in U.S. Pat. No. 6,503,311 B1 and Yeh, et al., in U.S. Pat. No. 6,852,156 B2, have described anionic self-dispersed pigments prepared by ozone oxidation. Ito et al., in U.S. Pat. No. 6,488,753 B1 and Momose et al., in EP 1,479,732 A1, describe anionic self-dispersed pigments prepared by hypochlorite oxidation.

While these self-dispersed pigments provide many advantages as colorants over other known colorants, they still suffer from inter-color mixing, the so called inter-color bleed problem, when applied in close proximity one to another on a media to form a multicolor image or graphic. This problem can be particularly severe when the media chosen is an inexpensive, consumer target, plain paper.

Many solutions have been proposed to the inter color bleed problem in inkjet ink printing and imaging. Rehman, in U.S. Published Application 2003/0079651, describes the incorporation of salts in some dye-based inks of a multicolor ink set to destabilize colorants in another dye-based ink of the same set when the inks are applied in close proximity on an imaging medium. Specific inter-color bleed problems can be reduced in this manner. Interestingly, Osumi et al., U.S. Pat. No. 6,280,513 B1, describe inkjet inks employing self-dispersed carbons directly incorporating effective levels of salts to provide improved density and fiber coverage on plain papers. However, direct incorporation of the salts in the pigment-based ink does not inherently provide bleed control and further tends to cause self-dispersed pigment-based inks to be unstable to long term keeping. Rehman, in U.S. Pat. No. 6,187,086 B1, describes the use of specific ink solvents in pigment-based inks of a multicolor ink set to destabilize colorants when dye-based inks of the set are applied in close proximity to an imaging medium. Lin, U.S. Pat. No. 6,475, 271 B2, describes the incorporation of low boiling organic solvents in particular inks of an inkjet ink set to promote rapid drying and thus reduce inter-color bleed. Yamazaki, et al., U.S. Patent 2004/0,123,774 A1, describes the choice of high carbon content solvents in particular inks of an inkjet ink set to promote ink localization on chosen media and thus reduce inter-color bleed. Lin, U.S. Pat. No. 6,383,274 and Ma, et al., U.S. Pat. No. 6,436,180 B1, describe the use of perfluoroalkyl surfactants to selectively adjust the surface tension of specific inks in an inkjet ink set for the purpose of reducing inter-color bleed. Hayashi, U.S. Pat. No. 6,500,248 B1, describes the incorporation of effective quantities of dynamic surface tension (DST) reducing surfactants in text black inks for the purpose of reducing inter-color bleed. Unfortunately, addition of such DST control agents to self-dispersed carbon containing inks further containing salts only exacerbates the already present ink stability problem.

Thus, while several approaches to controlling the inter-color bleed problem have been reported, the approaches tend to cause inherent ink instability issues on storage and keeping. Further, the formation of high, uniform and consistent single color densities on a variety of plain papers as well as designed ink-jet papers while simultaneously controlling inter color bleed not been adequately addressed.

SUMMARY OF THE INVENTION

This invention provides an ink jet ink comprising water, a charged self-dispersed pigment characterized in having a charge equivalence of at least 0.5 mEq/g, a volatile counterion content of 0.01 to 0.5 percent by weight, and a surface-active paper penetrant. In one embodiment the charged self-dispersed pigment is an anionic self-dispersed pigment characterized in having an acid equivalence of at least 0.5 mEq/g, and the volatile counterion is an ammonium ion. While the ink can be used alone, it is preferably employed as part of an ink set having distinct cyan, magenta, yellow and black inks.

It has now surprisingly been found that inks employing self-dispersed pigments having unusually high levels of surface derivitization in combination with other specific ink components are very stable on storage and keeping while simultaneously enabling improved fiber coverage and reduced bleed on plain papers.

DETAILED DESCRIPTION OF THE INVENTION

In general, the colored ink jet ink composition of the current invention consists of an aqueous vehicle which functions as a carrier, and a self-dispersing pigment. Additives and/or co-solvents can be incorporated in order to adjust the ink to attain the desired performance, and will be described in detail later herein. The ink composition may be yellow, magenta, cyan, black, gray, red, violet, blue, green, orange, brown, etc.

Self-dispersed pigments are those that are dispersible without the use of a dispersant or surfactant. Self-dispersed pigment refers to pigments that have been chemically modified with a covalently bound charge or a covalently bound oligomeric or polymeric group, wherein the covalently bound chemical modification aids the pigment in becoming and/or substantially remaining dispersed in a liquid vehicle. For example, pigments of this type may be those that have been subjected to a surface treatment such as oxidation/reduction, acid/base treatment, or functionalization through coupling chemistry. The surface treatment can render the surface of the pigment with anionic, cationic or non-ionic groups. Examples of commercially available self-dispersing type pigments include ISIS 25K® (Degussa AG), Cab-O-Jet 250®, Cab-O-Jet 260®, Cab-O-Jet 270®, Cab-O-Jet 200® and Cab-O-Jet 300® (Cabot Specialty Chemicals, Inc.) and Microjet Black CW-1® (Orient Chemical Industries, Ltd.). The aforesaid mentioned self-dispersed pigments exhibit a wide range of charge equivalence. The self-dispersed pigment useful in the invention must have a charge equivalence of at least 0.5 mEq/g, and more preferably of 0.5 to 3.0 mEq/g. The charged self-dispersed pigment is preferably negatively charged (anionic) and the charge-carrying group is preferably a covalently bound carboxylate or benzoate.

Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Black pigments are particularly suitable. Suitable classes of colored pigments include, for example, anthraquinones, phthalocyanine blues, phthalocyanine greens, diazos, monoazos, pyranthrones, perylenes, heterocyclic yellows, quinacridones, diketopyrolo-pyroles, and (thio)indigoids. The following example pigments, may be chemically modified as appropriate to form self-dispersing pigments. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 110, Pigment Yellow 117, Pigment Yellow 128, Pigment Yellow 138, Pigment Yellow 151 and Pigment Yellow 155. A representative example of diketopyrolo-pyroles include Pigment Red 254. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). Representative examples of black pigments include various carbon blacks (Pigment Black 7) such as channel blacks, furnace blacks and lamp blacks, and include, for example, carbon blacks sold under the Regal.RTM., Black Pearls.RTM., Elftex.RTM., Monarch.RTM., Mogul.RTM., and Vulcan.RTM. trademarks available from Cabot Corporation (such as Black Pearls.RTM. 2000, Black Pearls.RTM. 1400, Black Pearls.RTM. 1300, Black Pearls.RTM. 1100, Black Pearls.RTM. 1000, Black Pearls.RTM. 900, Black Pearls.RTM. 880, Black Pearls.RTM. 800, Black Pearls.RTM. 700, Black Pearls.RTM. L, Elftex.RTM. 8, Monarch.RTM. 1400, Monarch.RTM. 1300, Monarch.RTM. 1100, Monarch.RTM. 1000, Monarch.RTM. 900, Monarch.RTM. 880, Monarch.RTM. 800, Monarch.RTM. 700, Mogul.RTM. L, Regal.RTM. 330, Regal.RTM. 400, Vulcan.RTM. P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation. In one suitable embodiment the pigment is carbon black.

Other suitable pigments within the scope of the present invention include carbon products such as graphite, vitreous carbon, carbon fibers, activated charcoal, and activated carbon. The carbon may be of the crystalline or amorphous type. Finely divided forms of the above are preferred; also, it is possible to utilize mixtures of different carbons.

Self-dispersed pigment-based ink compositions useful in the invention may be prepared by any method known in the art of ink jet printing. Useful methods commonly involve two steps: (a) a physical dispersing or milling step to break up pigment agglomerates to useful sized aggregates or to primary particles, where primary particle is defined as the smallest identifiable subdivision in a particulate system, and (b) a dilution step in which the pigment dispersion from step (a) is diluted with the remaining ink components to give a working strength ink. In the case of self-dispersed pigments, the chemical modification to covalently bind the functional group(s) aiding self-dispersion can occur pre-, during, or post the physical dispersing step.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium, which is typically the same as, or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into useful aggregates or primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of ink jet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. Nos. 5,679,138, 5,651, 813 or 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. Nos. 4,597,794; 5,085,698; 5,519,085; 5,272,201; 5,172,133; or 6,043,297; and graft copolymers; see for example, U.S. Pat. Nos. 5,231,131; 6,087,416; 5,719,204; or 5,714,538.

The surface charged self-dispersed pigments particularly useful in the invention can be prepared as described in the art. Several workers have reported the preparation of covalently functionalized self-dispersed pigments suitable for ink jet printing. Bergemann, et al., in U.S. Pat. No. 6,758,891 B2 describe the covalent functionalization of pigments by reaction with organic triazoles. Bergemann, et al., in U.S. Pat. No. 6,660,075 B2 further describe the covalent functionalization of pigments by reaction with unsaturated organic compounds. Belmont in U.S. Pat. No. 5,554,739, Adams and Belmont in U.S Pat. No. 5,707,432, Johnson and Belmont in U.S. Pat. Nos. 5,803,959 and 5,922,118 and in published applications WO 96/18695, WO 96/18696, WO 96/18689, WO 99/51690, WO 00/05313, and WO 01/51566 describe the covalent functionalization of pigments with diazonium compounds. Like preparations of covalently functionalized self-dispersed pigments are additionally described by Osumi et al., in U.S. Pat. Nos. 6,280,513 B1 and 6,506,239 B1. These publications further describe the preparation and use of inkjet inks employing the described self-dispersed pigments. Both anionic and cationic self-dispersed pigments are described. Karl, et al., in U.S. Pat. No. 6,503,311 B1 and Yeh et al., in U.S. Pat. No. 6,852,156 B2, have described anionic self-dispersed pigments prepared by ozone oxidation. Ito et al., in U.S. Pat. No. 6,488,753 B1 and Momose et al., in EP 1,479, 732 A1, describe anionic self-dispersed pigments prepared by hypochlorite oxidation. When applied to pigments, this procedure introduces surface bound acid groups on the pigment to form a self-dispersed anionic pigment suitable for use in ink-jet ink. All of the above patents are incorporated herein by reference. Again, the extent of surface modification can be influenced by choice of reaction conditions. The pigment particle size can be adjusted by choice of pigment formation and milling conditions as described in the self-same art.

While both anionic and cationic charged self-dispersed pigments are known and can be employed in the practice of the invention, anionic, i.e. negatively charged self-dispersed pigments are preferred. The average extent of surface modification actually achieved for each pigment sample can be experimentally found by first adjusting know portions of the individual dispersion samples to a pH of about 12 with hydroxide solution and then titrating the pH adjusted dispersion samples with 0.1N nitric acid to a pH of about 1.5. The pH of a dispersion sample is monitored as a function of the quantity of 0.1N nitric acid added and a titration curve determined. The acid equivalence of the individual dispersion samples was calculated from: a) the carbon content of the individual samples, as determined by evaporation of volatiles or precipitation and by addition of acetonitrile as convenient in each case; and b) the molar quantity of acid required to carry an individual sample from the high pH inflection point to the low pH inflection point of the titration curve. In the case of cationic (i.e. positively charged) pigments, adjustment to a pH of about 1.5 with titration by addition of 0.1N sodium hydroxide to a pH of about 12 and analysis as described can lead directly to the quantity of base required to fully neutralize the appended charge. The charged self-dispersed pigments of the invention require a charge density of at least 0.5 mEq/g, to be useful. The charge density is preferably between 0.5 mEq/g and 3 mEq/g, and more preferably between 0.55 mEq/g and 2 mEq/g.

Ultrafine Particle Analysis using a Microtrak particle analyzer can determine particle size distributions of the individual self-dispersed pigments. The self-dispersed pigments useful in the invention are characterized in having $50^{th}$ percentile particle size of 15 to 200 nm, and preferably a $50^{th}$ percentile particle size of 50 to 150 nm.

The pigments will typically have a wide range of BET surface areas, as measured by nitrogen adsorption. Preferably, the pigment has a surface area equal to or greater than 10 $m^2/g$, and more preferably equal to or greater than and 100 $m^2/g$, thereby corresponding to a smaller primary/aggregate particle size. Such surface areas have been found to provide for a more uniform distribution and efficient level of treating agent on the pigment and a higher percent yield of the modified pigment after post processing techniques. If the preferred higher surface area of the pigment (thereby corresponding to a smaller particle size) is not readily available, it is well recognized by those skilled in the art that the pigment may be subjected to conventional size comminution or reduction techniques, such as ball or jet milling, to reduce the pigment to the desired particle size.

The ink compositions can be formed with a minimum of additional components (additives and/or cosolvents) and processing steps. The modified pigment is present in the ink compositions in an amount effective to provide the desired image qualities (for example, optical density) without detrimentally affecting the performance of the ink. For example, typically, the modified pigment will be present in an amount ranging from about 1% to about 20% based on the weight of the ink. It is also within the bounds of the present invention to use a formulation containing a mixture of unmodified pigments with the modified pigments described above.

The charged pigments employed in the practice of the invention inherently carry a counterion to maintain overall charge neutrality. With anionic pigments, the counterion as supplied is typically a low molecular weight inorganic ion such as sodium or potassium. The pigments of the invention can be used in that state or the low molecular weight inorganic counterion can be replaced by a volatile counterion using ion exchange and dialysis treatment as well known in the art. When the charged self-dispersed pigment is anionic, then the preferred volatile counterion is ammonium or a low molecular weight amine included at 0.005 to 0.2 percent by weight, and preferably at 0.01 to 0.1 percent by weight. In addition to ammonia, simple alkyl amines with a molecular weight of less than 112 g per mole can be employed. In a preferred embodiment, the volatile counterion is present at a molar quantity of less than 200% relative to the charge equivalence carried by the self-dispersed pigment, preferably at a molar equivalent of 20% to 150% relative to the charge equivalence carried by the self-dispersed pigment and more preferably at a molar quantity of 60% to 120% relative to the charge equivalence carried by the self-disperse pigment.

When a volatile, low molecular weight amine is employed as the counterion in the inks of the invention, then the ink can further comprise up to about 2 percent by weight of an optional organic acid as a pH control agent. The organic acid is preferably a volatile organic acid having a molecular weight of less than 140 g per mole. It is preferable a carboxylic acid and more preferable chosen from the group consisting of formic acid, acetic acid and propionic acid.

When a cationic charged self-dispersed pigment is employed, then the counterion present in the ink is preferably a low molecular weight volatile organic acid and the optional organic base is a volatile amine or organic amine as already recited.

The inks useful in the practice of the invention further comprise a surface-active paper penetrant, preferably present at 1 to 3.5 percent by weight. Smaller quantities of penetrant fail to adequate address bleed while a larger quantity of penetrant can sufficiently suppress ink surface tension so that ink leaks from a firing head nozzle. Preferably, the surface-active paper penetrant enables an ink surface tension of 30 mN/m to 55 mN/m at a surface age of 0.01 second. While any surface-active paper penetrant can be employed, these compounds are know to be especially useful: ethyleneglycol monobutyl ether, ethyleneglycol phenyl ether, diethyleneglycol monobutyl ether, triethyleneglycol monobutyl ether, diethyleneglycol monopropyl ether, dipropyleneglycol monopropyl ether, propyleneglycol monopropyl ether, propylene glycol monobutyl ether, 1,2-butanediol, 1,2 pentanediol, 1,2-hexanediol, 1,5-pentanediol, 1,6-hexanediol, and 1-phenyl-1,2-ethanediol.

The colorants used in the ink composition of the invention may be present in any effective amount, generally from 0.1 to 10% by weight, and preferably from 0.5 to 6% by weight.

The ink composition may contain non-colored particles such as inorganic or polymeric particles in order to improve gloss differential, light and/or ozone resistance, waterfastness, rub resistance and various other properties of a printed image; see for example, U.S. Pat. Nos. 6,598,967 B1; 6,508,548 B2; or 5,925,178. U.S. Pat. No. 6,508,548 B2 describes the use of water-dispersible polymeric latex in dye-based inks in order to improve light and ozone resistance of the printed images. Such particulate addenda may also improve gloss differential.

Examples of inorganic particles useful in the invention include, but are not limited to, alumina, boehmite, clay, calcium carbonate, titanium dioxide, calcined clay, aluminosilicates, silica, or barium sulfate.

For aqueous-based inks, polymeric particles useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco). These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyvinyl pyrrolidones, carboxy methyl cellulose, polyethyloxazolines, polyethyleneimines, polyamides and alkali soluble resins; polyurethanes (such as those found in U.S. Pat. No. 6,268,101), polyacrylic acids, styrene-acrylic methacrylic acid copolymers (such as; as Joncryl® 70 from S.C. Johnson Co., TruDot™ IJ-4655 from MeadWestvaco Corp., and Vancryl® 68S from Air Products and Chemicals, Inc.

Ink compositions useful in the invention include humectants and/or co-solvents in order to prevent the ink composition from drying out or crusting in the nozzles of the print head, aid solubility of the components in the ink composition, or facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

Surfactants may be added to adjust the surface tension of the ink to an appropriate level. The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products). Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide may be added to an ink jet ink composition to suppress the growth of micro-organisms such as molds, fungi, etc. in aqueous inks. Preferred biocide for an ink composition include Proxel® GXL (Zeneca Specialties Co.) and Kordex-MLX at a final concentration of 0.0001-0.5 wt. %. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks can have a pH of from about 2 to 10 and preferably have a pH of between 6 and 9, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

The exact choice of ink components will depend upon the specific application and performance requirements of the print head from which they are jetted. Thermal and piezoelectric drop-on-demand print heads and continuous print heads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP and most preferably in the range of 1.5 and 3 cP. Acceptable static surface tensions are no greater than 60 dynes/cm, and preferably in the range of 28 dynes/cm to 45 dynes/cm. The ink jet inks useful in the invention typically exhibit a solution density of between 1 and 1.2 g/cc.

The inks of the invention are preferably utilized in an ink jet set comprising at least magenta, cyan, yellow and black inks. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. Nos. 5,866,638 or 6,450,632 B1. Colorless inks are also used to provide an overcoat to a printed image, usually in order to improve scratch resistance and waterfastness; see for example, U.S. 2003/0009547 A1 or E.P. 1,022,151 A1. Colorless inks are also used to reduce gloss differential in a printed image; see for example, U.S. Pat. No. 6,604,819 B2; U.S. 2003/0085974 A1; U.S. 2003/0193553 A1; or U.S. 2003/0189626 A1.

The following examples are intended to illustrate, not to limit, the invention.

EXAMPLES

Preparation and Characterization of Self-dispersed Pigments.

Anionic derivitized carbon self-dispersed pigments SD-1 through SD-3 were prepared as described in the art. The average extent of surface modification actually achieved for each pigment sample can be experimentally found by first adjusting know portions of the individual dispersion samples to a pH of about 12 with hydroxide solution and then titrating the pH adjusted dispersion samples with 0.1N nitric acid to a pH of about 1.5. The pH of a dispersion sample is monitored as a function of the quantity of 0.1N nitric acid added and a titration curve determined. The acid equivalence of the individual dispersion samples was calculated from: a) the carbon content of the individual samples, as determined by evaporation of volatiles or precipitation and by addition of acetonitrile as convenient in each case; and b) the molar quantity of acid required to carry an individual sample from the high pH inflection point to the low pH inflection point of the titration curve. In parallel experiments, the particle size distributions of the individual self-dispersed pigments can be determined by Ultrafine Particle Analysis using a Microtrak particle analyzer. Anionic self-dispersed pigment SD-1 exhibited a 50% size of about 130 nm and an acid equivalency of about 0.40 mEq/g carbon; anionic self-dispersed pigment SD-2 exhibited a 50% size of about 90 nm and an acid equivalency of about 0.84 mEq/g carbon; while anionic self-dispersed pigment SD-3 exhibited a 50% size of about 160 nm and an acid equivalency of about 0.60 mEq/g carbon.

Preparation of Pigmented Ink-jet Inks 1 through 11:

Text Black ink 1 was prepared by admixing 4% by pigment weight of self-dispersed pigment SD-1 with 5% polytheleneglycol-400, 10% 2-pyrrolidinone, 0.03% sodium dodecylbenzene sulfonate; 0.02% Kordex antimicrobial and 0.1% triethanolamine in water with pH adjusted to 7.7 with formic acid.

Text Black ink 2 was like Text Black ink 1 except for the addition of 1.8% 1,2-hexanediol.

Text Black ink 3 was like Text Black ink 1 except for the replacement of the triethanolamine by 0.05% ammonia.

Text Black ink 4 was like Text Black ink 1 except for the addition of 1.8% 1,2-hexanediol and the replacement of the triethanolamine by 0.05% ammonia.

Text Black ink 5 was prepared by admixing 4.3% by pigment weight of self-dispersed pigment SD-2 with 6.9% glycerol, 5% diethyleneglycol, 7% 2-ethyl-2-hydroxymethyl-1,3-propanediol, 0.14% ammonia and 3% 1,2-hexanediol with pH adjusted to 7.7 with benzoic acid.

Text Black ink 6was prepared by admixing 4% by pigment weight of self-dispersed pigment SD-3 with 18% diethyleneglycol, 0.03% Strodex PK-90; 0.02% Kordex antimicrobial 0.05% ammonia and 3% 1,2-hexanediol with pH adjusted to 7.7 with formic acid.

Cyan colored Ink-jet Ink 31 (having an anionic conventionally dispersed pigment) was prepared by mixing about 2.2% of anionic surfactant stabilized cyan pigment (from a ca. 10% dispersion of OMT [potassium N-methyl-N-oleoyl taurate] dispersed cyan pigment PB15: 3 micro-milled according to Bishop and Czekai, U.S. Pat. No. 5,679,138), with 5% ethylene glycol, 10% glycerol, 1% Surfynol-465, 1.1% Trudot IJ4655, with the balance water at pH ~8.3.

Yellow colored Ink-jet Ink 32 (having an anionic conventionally dispersed pigment) was prepared by mixing about 3% of anionic surfactant stabilized yellow pigment (from a ca. 10% dispersion of OMT [potassium N-methyl-N-oleoyl taurate] dispersed yellow pigment PY155 micro-milled according to Bishop and Czekai, U.S. Pat. No. 5,679,138), with 5% ethylene glycol, 10% glycerol, 1.2% Trudot IJ4655, 0.13% triethanolamine and 0.25% Surfynol-465 with the balance water at pH ~8.3.

Magenta colored Ink-jet Ink 33 (having an anionic conventionally dispersed pigment) was prepared by mixing about 3% of anionic surfactant stabilized magenta pigment (from a ca. 10% dispersion of OMT [potassium N-methyl-N-oleoyl taurate] dispersed magenta pigment PR122 micro-milled according to Bishop and Czekai, U.S. Pat. No. 5,679,138), with 5% ethyleneglycol, 18% glycerol, 1.2% Trudot, 0.13% triethanolamine and 0.5% Surfynol-465 with the balance water at pH ~8.3.

Evaluation of Inks:

The inks were loaded into ink jet ink cartridges having sponges, apertures and aligning appendages all as known in the art. Inks 1 to 10 were individually assembled into ink sets with inks 31, 32 and 33 to form 6 four-color ink jet ink sets. The inks were applied singly and in combination using a thermal ink jet apparatus (Canon i960) to a variety of commercially available general purpose and inkjet designed plain papers using digital drivers to form images suitable for evaluating large area uniformity and fiber coverage as well as inter-color bleed. The plain papers employed included Georgia Pacific Inkjet Paper, Hammermill Fore Multipurpose Paper and Hewlett Packard Multipurpose Paper. Both the formed density and the uniformity of the formed density deposits were visually examined, as was the inter-color bleed. The uniformity of the formed deposits can be influenced by the appearance of paper fibers that are not colored by the applied inks or ink combinations. In separate experiments the inks were kept at 60° C. for 2 weeks and 4 weeks and the $50^{th}$ percentile and $95^{th}$ percentile particle sizes were monitored using a Microtrac Ultrafine Particle Analyzer. A $95^{th}$ percentile particle growth of less than 50% after 4-week incubation at 60 C was deemed to provide adequate ink stability.

| Ink | Fiber Coverage | Intercolor Bleed | Ink Stability |
|---|---|---|---|
| 1 | Good | Poor | Acceptable |
| 2 | OK | OK | Acceptable |
| 3 | Very Good | Poor | Acceptable |
| 4 | Very Good | Good | Not Acceptable |
| 5 - INV | Very Good | Very Good | Acceptable |
| 6 - INV | Good | Very Good | Acceptable |

Additional Ink Evaluations:

Text Black ink 11 was like ink 6 except that the 1,2-hexanediol was replaced by 1,6-hexanediol. Both image quality and keeping stability were acceptable.

The invention has been described in detail with particular reference to certain preferred embodiments thereof, but it will be understood that variations and modifications can be effected within the spirit and scope of the invention.

The invention claimed is:

1. An ink jet ink comprising water, a charged self-dispersed pigment characterized in having a charge equivalence of at least 0.5 mEq/g, a volatile counterion content of 0.01 to 0.5 percent by weight, and a surface-active paper penetrant.

2. The ink jet ink of claim 1 wherein the charged self-dispersed pigment is an anionic self-dispersed pigment characterized in having an acid equivalence of at least 0.5 mEq/g, and the volatile counterion is an ammonium ion.

3. The ink jet ink of claim 2 wherein the anionic self-dispersed pigment has an acid equivalence of 0.5 to 3 mEq/g.

4. The ink jet ink of claim 2 wherein the anionic self-dispersed pigment has a $50^{th}$ percentile particle size of 15 to 200 nm.

5. The ink jet ink of claim 2 wherein the anionic self-dispersed pigment has a $50^{th}$ percentile particle size of 50 to 150 nm.

6. The ink jet ink of claim 2 wherein the ammonium ion content is 0.005 to 0.2 percent by weight.

7. The ink jet ink of claim 2 wherein the ammonium ion content is 0.01 to 0.1 percent by weight.

8. The ink jet ink of claim 2 wherein the surface-active paper penetrant is present at 1 to 3.5 percent by weight.

9. The ink jet ink of claim 2 wherein the surface-active paper penetrant enables an ink surface tension of 30 mN/m to 55 mN/m at a surface age of 0.01 second.

10. The ink jet ink of claim 2 wherein the surface active penetrant is chosen from the group consisting of ethyleneglycol monobutyl ether, ethyleneglycol phenyl ether, diethyleneglycol monobutyl ether, triethyleneglycol monobutyl ether, diethyleneglycol monopropyl ether, dipropyleneglycol monopropyl ether, propyleneglycol monopropyl ether, propylene glycol monobutyl ether, 1,2-butanediol, 1,2 pentanediol, 1,2-hexanediol, 1,5-pentanediol, 1,6-hexanediol, and 1-phenyl-1,2-ethanediol.

11. The ink jet ink of claim 2 wherein the pigment is a cyan colored, magenta colored, yellow colored or black colored pigment.

12. The ink jet ink of claim 2 wherein the pigment is a carbon black.

13. The ink jet ink of claim 2 further comprising an organic acid, present in an amount of up to 2 percent by weight.

14. The ink jet ink of claim 13 wherein the organic acid is a carboxylic acid having a molecular weight of less than 140 g per mole.

15. The ink jet ink of claim 13 wherein the organic acid is a volatile organic acid.

16. The ink jet ink of claim 13 wherein the organic acid is chosen from the group consisting of formic acid, acetic acid and propionic acid.

17. The ink jet ink of claim 2 having a solution density of 1 to 1.2 g/cc and a viscosity of 1.5 to 3 cP.

18. The ink jet ink of claim 2 wherein the anionic self-dispersed pigment has an acid equivalence of 0.5 to 3 mEq/g and a $50^{th}$ percentile particle size of 15 to 200 nm; the ammonium ion content is 0.005 to 0.2 percent by weight, and wherein the surface-active paper penetrant is present at 1 to 3.5 percent by weight and enables an ink surface tension of 30 mN/m to 55 mN/m at a surface age of 0.01 second.

19. The ink jet ink of claim 18 wherein the pigment is a carbon black.

20. The ink jet ink of claim 18 further comprising up to 2 percent by weight of a volatile carboxylic acid having a molecular weight of less than 140 g per mole.

21. The ink jet ink of claim 18 wherein the anionic self-dispersed pigment has a $50^{th}$ percentile particle size of 50 to 150 nm.

22. The ink jet ink of claim 1 wherein the ammonium ion content is 0.01 to 0.1 percent by weight.

23. An ink jet ink comprising water, a charged self-dispersed pigment characterized in having a charge equivalence of at least 0.5 mEq/g, a volatile counterion content of 20 mol % to 200 mol % based on said charge equivalence, and a surface-active paper penetrant.

24. An ink jet ink set comprising distinct cyan, magenta, yellow and black inks, at least one of which is an ink jet ink comprising water, a charged self-dispersed pigment characterized in having a charge equivalence of at least 0.5 mEq/g, a volatile counterion content of 0.01 to 0.5 percent by weight, and a surface-active paper penetrant.

25. An ink jet ink set comprising distinct cyan, magenta, yellow and black inks, at least one of which is an ink jet ink according to claim 2 comprising water, a charged self-dispersed pigment characterized in having a charge equivalence of at least 0.5 mEq/g, a volatile counterion content of 0.01 to 0.5 percent by weight, and a surface-active paper penetrant, wherein the charged self-dispersed pigment is an anionic self-dispersed pigment characterized in having an acid equivalence of at least 0.5 mEq/g, and the volatile counterion is an ammonium ion.

* * * * *